United States Patent [19]
Barr et al.

[11] Patent Number: 4,507,973
[45] Date of Patent: Apr. 2, 1985

[54] HOUSING FOR CAPACITIVE PRESSURE SENSOR

[75] Inventors: Rodney E. Barr, Cary, N.C.; George E. Kochanek, Glen Ellyn, Ill.

[73] Assignee: Borg-Warner Corporation, Chicago, Ill.

[21] Appl. No.: 528,281

[22] Filed: Aug. 31, 1983

[51] Int. Cl.³ .............................................. G01L 9/12
[52] U.S. Cl. ..................................... 73/724; 73/431; 361/283
[58] Field of Search ........................ 73/324, 318, 431; 361/283

[56] References Cited
U.S. PATENT DOCUMENTS

| | | | |
|---|---|---|---|
| 3,479,879 | 11/1969 | Music | 73/718 |
| 3,859,575 | 1/1975 | Lee et al. | 317/246 |
| 4,089,036 | 5/1978 | Geronime | 361/283 |
| 4,125,027 | 11/1978 | Clark | 73/724 |
| 4,295,376 | 10/1981 | Bell | 73/724 |
| 4,382,377 | 5/1983 | Kleinschmidt et al. | 73/35 |
| 4,382,385 | 5/1983 | Paros | 73/702 |
| 4,434,451 | 2/1984 | Delatorre | 73/718 |
| 4,458,537 | 7/1984 | Bell et al. | 73/718 |

Primary Examiner—Donald O. Woodiel
Attorney, Agent, or Firm—Florian S. Gregorczyk

[57] ABSTRACT

A housing for a capacitive pressure sensor generally utilized to measure fluid pressure. A metallic housing for a ceramic diaphragm provides greater flexural strength to compensate for the differences in the thermal expansion and bulk modulus of elasticity of such ceramic diaphragm and metal housing.

7 Claims, 2 Drawing Figures

HOUSING FOR CAPACITIVE PRESSURE SENSOR

BACKGROUND OF THE INVENTION

1. Field of the Invention

A housing for a capacitive pressure sensor for use in the measurement of pressure in a fluid medium, which medium may be either liquid or gas.

2. Prior Art

Capacitive pressure sensors as known in the prior art generally teach a pressure responsive diaphragm forming one plate or electrode of a capacitor. These sensors, including their electrodes or plates, are generally seated or housed within an enclosure. This enclosure secures the sensors and provides a protective environment for the relatively sensitive electronics and their connecting leads. A protective environment is necessitated by the harsh circumstances in which many of these devices are utilized. An example of such an environment is that of an automobile engine where the pressure sensors are utilized to measure oil pressure, gas pressure, fuel line pressure, etc. An independent housing or protective means for a pressure sensor may require the marriage of the attributes of two dissimilar materials for a particular application to utilize their inherent physical properties. Such usage of incompatible materials provides a means for ease of manufacture, calibration, and improved economies.

There are inherent problems in the capacitive structures or capacitive sensor structures taught in today's technology. Included among these are the use of ceramics for capacitive sensors which ceramics are generally hard and brittle. While useful in many applications, a very hard material provides problems for a broader range of applications. Techniques are continually being developed to mask or overcome such problems while continuing to utilize the relatively low cost ceramic material, which has a thermal or electrical insulating characteristic and relatively low flexural and tensile strength. These insulating characteristics of the ceramic material are desired in capacitive sensors. However, the ceramic must be protected to compensate for its lack of flexural strength and to protect the electronics associated with such capacitive sensors when utilized in a hostile environment. Housings for capacitive sensors require ease of assembly to the ceramic, fatigue strength, tensile strength, high temperature tolerance, and ease of manufacture. Further, these materials must lend themselves to very small sizes as a primary concern of any such sensor is its relative size.

A recognition of many of the problems associated with sensing means and their housings are discussed throughout the art. U.S. Pat. No. 3,859,575 (Lee et al.) discusses some of the physical problems which must be overcome, such as relief of stress upon the structure and the thermal affects on the assembly in an inhospitable environment. In this patent they have taught the use of stress relieving to eliminate hysteresis from the sensing connecting structure and further, to utilize such structure to decrease the thermal path lengths to reduce thermal affects upon such sensors. The electrically conductive surfaces are insulated from the central connecting means and each other in this patent. This disclosure recognizes the physical parameters needed for such applications, that is, the utilization of a fabricated hardened steel to provide good elastic qualities and low hysteresis. Such sections may also be of stainless steel. A glass may be utilized as a suitable insulating material to provide extremely small thermal shifts. It's questionable what is referred to as a glass although quartz may be implied, and it is clearly recognized that the insulating characteristics required for such applications are inherent in any electrically conductive application.

U.S. Pat. No. 4,089,036 (Geronime) teaches a capacitive-type load cell utilizing a support, a diaphragm member mounted with respect to such support and a conductive surface with a capacitor plate attached thereto. The diaphragm must have free edge bending characteristics at its outer peripheral edges as well as between the diaphragm and a load support button to reduce radial bending stresses during loading. Again, the physical characteristics required by such load cells or transducer assemblies is perceived. The recognition of the difficulty of having a metal object as a housing member is noted and requires the use of that housing as a conductive surface. The use of a housing structure as disclosed in Geronime '036 is cognizant of the effect of thermal transients acting upon such a load cell. The structure and orientation of the capacitor plates along with the associated surfaces of the housing attempt to overcome the effect of the stress loading and the thermal transients associated with these stresses. Although load cells are frequently associated with large masses, the harsh environmental characteristics frequently associated with these applications lend themselves the use of such transducer or capacitive sensor assemblies.

U.S. Pat. No. 4,125,027 (Clark) takes note of the characteristics which are preferred in the application of a gage utilizing a load cell-type structure for pressure measurement. In this disclosure, a tubular portion is utilized as a housing. This tubular portion is shown at lower portion 12 in FIGS. 1 through 3. Incorporated within such lower portion is a stator or stator assembly of a ceramic material whereas the housing 12 is of a conductive material, which would include most metallic elements and alloys. Further, this gage is taught to be adaptable for temperature compensation.

A force responsive transducer is taught in U.S. Pat. No. 4,295,376 (Bell) wherein a capacitive-type sensor is housed in a generally rectangular structure to accommodate the electronic circuitry associated with the transducer. This capacitive transducer recognizes the rigidity of glass and ceramic elements. Further, it recognizes that torsional and bending moments within such transducers must be accounted for. Bell '376 takes note of the fact that the enclosure should be sealed to provide a gas-type relationship to the diaphragm cavity or body especially where gas leakage must be avoided.

U.S. Pat. No. 4,382,385 (Paros) teaches a differential pressure transducer utilizing a beam and pivot arrangement. The beam is operable by a single or dual bellows arrangement within a housing, however, the assembly of the patent to Paros '385 takes note of the pressures and their affects upon such constructions. To this end the first and second bellows isolate the resonator from the pressure inputs and a reducer means is provided to reduce the pressure error to an acceptable level by reducing the effective area of the first bellows relative to the area of the pressure sensing diaphragm. This arrangement takes note of the fact that such structures are stress sensitive.

The U.S. Pat. No. 4,382,377 (Kleinschmidt et al.) teaches a pressure sensor for an internal combustion engine utilizing a piezoceramic transducer connected in an operating fashion to the area to be sensed by way of a plunger having a membrane at its end and the sensor is secured in a cylinder head with the membrane located within such cylinder. The piezoceramic device is secured in a housing 17 and the pressure signal is transmitted through plunger 26 and tubular section 16. Kleinschmidt '377 teaches a prestressed ceramic device in housing 17. However, housing 17 is not taught to be of a specific material although it would appear to be of a material to compensate for the heat as well as being machinable as to be threaded. The threaded connection is connected to a cylinder head in a gas-tight manner with a wrench. This disclosure or patent takes note of the need for guaranteeing a longer service life of a thermally stressed, highly loaded membrane 15 no longer under a continuous mechanical prestress. It also recognizes the need for additional protection of the ceramic plate 21 of transducer 20 against high temperatures in a hostile environment in this case from a cylinder of an automobile engine.

SUMMARY OF THE INVENTION

The invention encompasses a housing for a capacitive sensor which is utilized in the measurement of pressure in a fluid medium. This housing provides a protective environment for a flexible ceramic diaphragm and associated electrode means of such capacitive sensors. the ceramic materials are generally brittle, hard and susceptible to fracture from fatigue or over stress. However, these same ceramic diaphragm materials have a relatively low flexural and tensile strength and provide an insulating material for use with electronics or more specifically a capacitive-type apparatus. The housing disclosed herein provides a means to retain the ceramic material in a cloistered environment while providing a means to utilize the high tensile strength, the flexural strength and other physical characteristics associated with a metal while retaining the ceramic material insulating property. The housing provides an economical seal means, and ease of assembly with the ceramic sensor. This marriage or mating of the dissimilar materials, that is the ceramic sensor and the metallic housing, enables the utilization of the insulating characteristics and relatively low strength of the ceramic with the tensile and flexural strength of the metal.

BRIEF DESCRIPTION OF THE DRAWINGS

In the figures of the drawing like reference numerals identify like components and in the drawings.

DETAILED DESCRIPTION OF THE INVENTION

Figure 1:
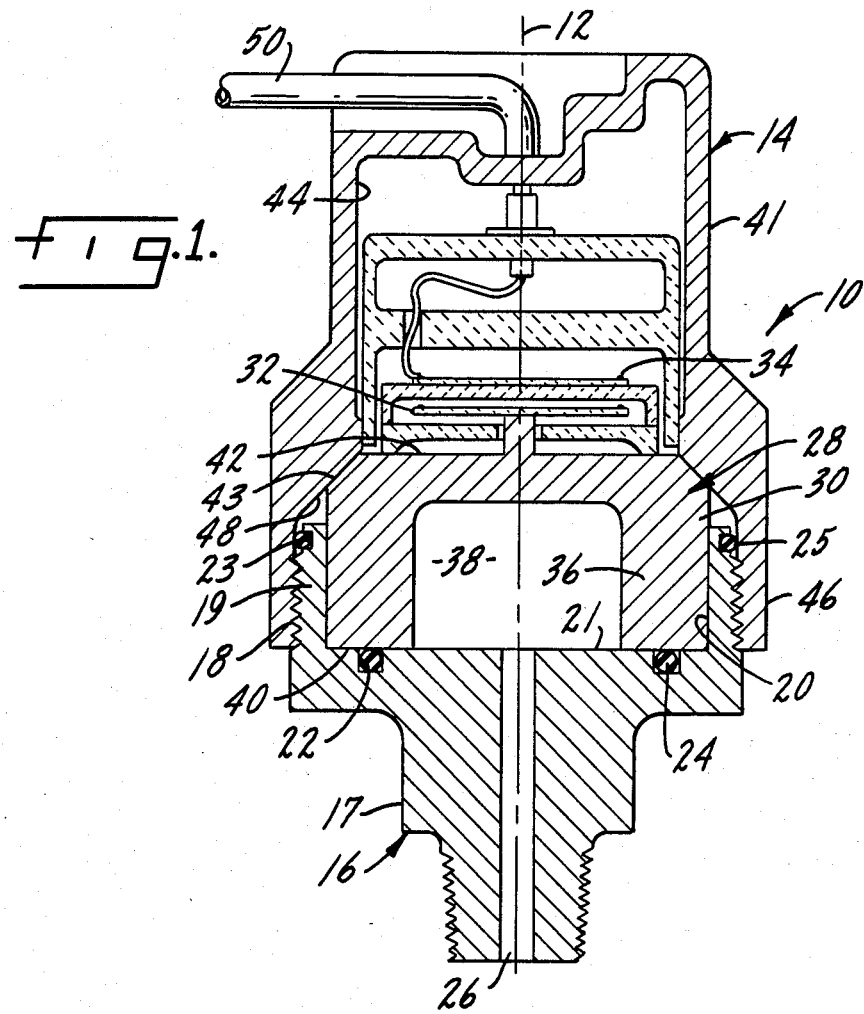
FIG. 1 is a cross-section of a housing and ceramic sensor retained therein.

The elements of the assembly of the housing for a capacitive sensor utilized in the measurement of pressure in a fluid medium are illustrated in FIG. 1. In FIG. 1 the housing 10 is shown with a longitudinal axis 12 vertically oriented. Housing 10 includes upper member 14 and lower member 16. These members 14 and 16 are matable by any method known in the art but are shown having screw threads 18.

Lower member 16 defines an outer surface 17, a sidewall 19 with a seal groove 23 having a seal means 25 therein, a recess 20 with lower face 21, and a groove 22 open at face 21 with a seal means 24 therein. Lower member 16 further defines a channel 26 communicating between recess 20 and the outer surface 17 of lower body member 16. As illustrated in FIG. 1, the cross-sectional view of recess 20 has a generally cylindrical shape and thus groove 22 with seal means 24 would be of a circular shape. However, this is by way of illustration not limitation.

Shown in FIG. 1 is a pressure or capacitive sensor 28 including a flexible ceramic diaphragm 30 and a pressure sensing element 32 with electronic means 34 positioned thereon is shown as positioned in recess 20. Flexible diaphragm 30 defines a sidewall 36, a pressure chamber 38, and a bottom surface 40. Bottom surface 40 is shown as contacting lower surface 21 and sidewalls 36 contact seal means 24 to provide a seal against leakage past sidewalls 36. Pressure chamber 38 is open to communication through channel 26 of lower member 16. Flexible diaphragm 30 further defines a reference surface 42 and a chamfered or angled shoulder 43 between sidewall 36 and reference surface 42. Upper body member 14 of housing 10 also has a generally cylindrical shape whose longitudinal axis lies along axis 12 and which upper member 14 defines an outer wall 41, a first portion 44 and a second portion 46 having a larger diameter than said first portion 44 with a shoulder 48 between first portion 44 and second portion 46. Upper body member 14 may be so shaped as to provide a safety containment for fluid leakage or diaphragm failure, and thereby contain operating fluid at operating pressure. Seal means 25 contacts upper member 14 and provides a further barrier against fluid leakage. As shown in FIG. 1, shoulder 48 has an angle or a slope which is supplemental to the angle or slope of the chamfer 43 of flexible diaphragm 30. Upper member 14 provides a bore or section to receive that part of the capacitive sensor 28 which extends beyond recess 20 of lower member 16.

As shown in FIG. 1, housing 10 provides a closed environment for capacitive sensor 28. Further, electronic connections or connections from the electronic means 34 of capacitive sensor 28 may extend through a sealed conduit 50 communicating between outer wall 41, housing member 14 and first portion 44. Upper member 14 is threaded onto lower member 16 at threaded junction 18. Shoulder 48 of upper member 14 contacts the chamfered shoulder 43 of flexible diaphargm 36 to secure its bottom surface 40 against lower face 21 of lower member 16, and maintains such lower surface 40 in contact with seal means 24. Thus, a gas tight seal is provided for fluid communication to recess 38 through channel 26 to flex diaphragm 30 and provide a capacitive sensor signal for communication through electronic means 34 as known in the art and taught in patent application Ser. No. 522,776 filed Aug. 12, 1983 by Browne.

Figure 2:
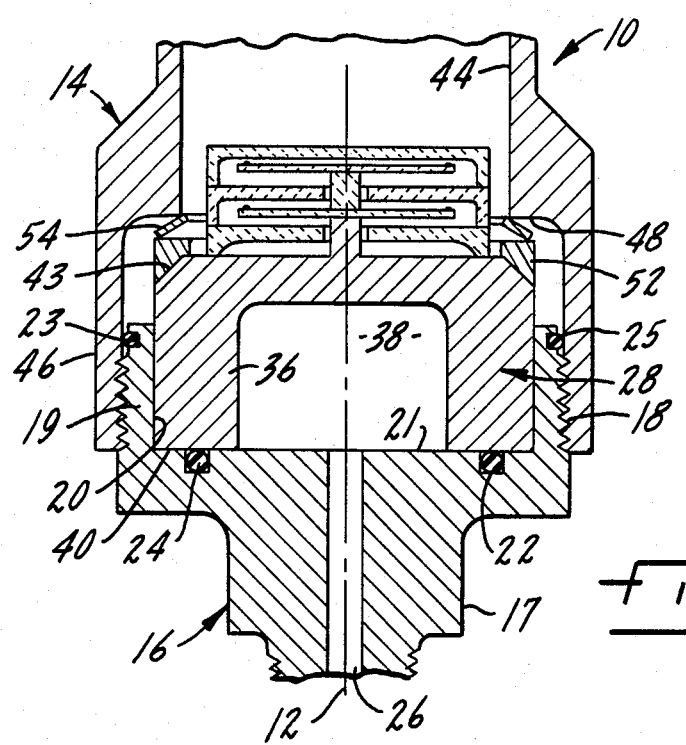
FIG. 2 is a sectional view of an alternative embodiment of the housing utilizing a spring and loading ring arrangement.

FIG. 2 illustrates an alternative embodiment of the present housing concept. In this embodiment shoulder 48 of upper member 14 is shown as normal to axis 12. In this embodiment a loading ring 52 is positioned on shoulder or chamfer 43 of flexible diaphragm 28 and a Bellville spring 54 is mounted or positioned between shoulder 48 and load ring 52 to secure diaphragm 28 against lower face 21 and seal means 24 of lower member 16. This utilization of a Bellville spring interposed between upper body member 14 and load ring 52 provides clamping means for those particular cases where a large thermal expansion may be experienced between the ceramic diaphragm and the housing. Such large differentials in thermal expansion would thereby be taken up by the Bellville spring while retaining the structural integrity of both the housing seal and the ceramic diaphragm.

In both of the embodiments above the capacitive sensor is retained in housing 10. Housing 10 provides a protective environment for such sensors especially ceramic sensors as the housing has a different, generally larger, thermal coefficient of expansion and bulk modulus of elasticity.

Those skilled in the art will recognize that certain variations can be made in the illustrative embodiment. While only specific embodiments of the invention have been described and shown, it is apparent that various alternatives and modifications can be made therein. It is, therefore, the intention in the appended claims to cover all such modifications and alternatives as may fall within the true scope of the invention.

I claim:

1. A housing for a capacitive sensor used in the measurement of pressure in a fluid, which capacitive sensor includes:
    a flexible ceramic diaphragm including a reference surface, a bottom surface, sidewalls, and a chamfered shoulder between said reference surface and sidewalls, and a pressure chamber open at the bottom surface, the reference surface being deflectable in response to a force acting in said pressure chamber;
    a capacitive sensor positioned so that its capacitance is varied as the diaphragm reference surface is deflected;
    wherein said housing comprises a lower member and an upper member connected to each other and enclosing the sensor;
    said housing lower member defining a recess for receiving the diaphragm sidewalls, and further defining a channel communicating with the diaphragm pressure chamber; and
    said housing upper member defines first and second portions of different diameters, and a shoulder between the first and second portions of different diameters, which shoulder abuts the chamfered shoulder of said flexible diaphragm.

2. A housing for a capacitive sensor as claimed in claim 1 wherein said lower member recess includes a face defining a groove to receive a seal means to contact said diaphragm bottom surface and seal said diaphragm pressure chamber.

3. A housing for a capacitive sensor as claimed in claim 2 wherein a loading ring is mounted on said chamfered shoulder and a Belleville spring is provided between said housing shoulder and said loading ring to maintain said diaphragm bottom surface against said seal means.

4. A housing for a capacitive sensor as claimed in claim 1 wherein a loading ring is mounted on said chamfered shoulder and a Belleville spring is provided between said housing shoulder and loading ring.

5. A housing for a capacitive sensor as claimed in claim 1 wherein said shoulder of said upper member is at an angle that is supplementary to said chamfered shoulder to be matable with said chamfered shoulder to maintain said sensor in said lower member recess.

6. A housing for a capacitive sensor as claimed in claim 1 wherein said sensor is of a ceramic material and said housing is of a metal with a different coefficient of expansion and bulk modulus of elasticity than said ceramic sensor retained therein.

7. A housing for a capacitive sensor as claimed in claim 1 wherein said lower member defines a sidewall and seal groove therein to receive a seal means, which seal means contacts said upper member to seal said capacitive sensor.

* * * * *